United States Patent [19]

Nakajima

[11] Patent Number: 5,048,110
[45] Date of Patent: Sep. 10, 1991

[54] METHOD AND APPARATUS FOR AUTOMATICALLY CORRECTING SUBTRACTION IMAGE DENSITY

[75] Inventor: Nobuyoshi Nakajima, Kanagawa, Japan

[73] Assignee: Fuji Photo Film Co., Ltd., Kanagawa, Japan

[21] Appl. No.: 318,465

[22] Filed: Feb. 27, 1989

Related U.S. Application Data

[63] Continuation of Ser. No. 9,117, Jan. 29, 1987, abandoned, which is a continuation of Ser. No. 717,972, Mar. 29, 1985, abandoned.

[30] Foreign Application Priority Data

Mar. 30, 1984 [JP] Japan .................................. 59-63042
Mar. 30, 1984 [JP] Japan .................................. 59-63043
Mar. 30, 1984 [JP] Japan .................................. 59-63044
Apr. 27, 1984 [JP] Japan .................................. 59-85723

[51] Int. Cl.$^5$ .............................................. G06K 9/40
[52] U.S. Cl. .................................. 382/54; 364/413.13; 364/413.22; 382/6
[58] Field of Search .................. 382/6, 54, 50, 41; 358/111; 364/413.13, 413.15, 413.16, 413.18, 413.22, 413.23; 378/99

[56] References Cited

U.S. PATENT DOCUMENTS

| | | | |
|---|---|---|---|
| 3,932,839 | 1/1976 | Stephens | 382/6 |
| 4,222,104 | 9/1980 | Moore | 382/6 |
| 4,315,318 | 2/1982 | Kato | 382/54 |
| 4,335,427 | 6/1982 | Hunt | 382/54 |
| 4,356,398 | 10/1982 | Komaki | 364/414 |
| 4,491,866 | 1/1985 | Verhoeven | 378/99 |
| 4,496,973 | 1/1985 | Horikawa | 364/414 |
| 4,534,059 | 8/1985 | Yamada | 382/54 |
| 4,546,255 | 10/1985 | Knoll | 364/414 |
| 4,590,517 | 5/1986 | Kato | 358/111 |
| 4,638,162 | 1/1987 | Tanaka | 364/414 |

Primary Examiner—David K. Moore
Assistant Examiner—Joseph Mancuso
Attorney, Agent, or Firm—Sughrue, Mion, Zinn, Macpeak & Seas

[57] ABSTRACT

In a temporal subtraction processing conducted by use of stimulable phosphor sheets, the difference between maximum transmitting radiation amount of digital image signals detected from the stimulable phosphor sheets carrying radiation images stored therein is calculated. The difference is added to a difference signal obtained by the subtraction processing prior to a gradation processing, or a gradation conversion table is shifted by the difference towards the high density side along the input signal coordinate axis. Or, read-out conditions in final read-out are adjusted so that the difference is eliminated. Or, a maximum frequency point signal is calculated from a histogram of the difference signal, the difference between a signal representing the standard background density of a subtraction image and the maximum frequency point signal is calculated, and correction is made so that the background density in the subtraction image becomes always the same.

4 Claims, 8 Drawing Sheets

METHOD AND APPARATUS FOR AUTOMATICALLY CORRECTING SUBTRACTION IMAGE DENSITY

This is a continuation of application Ser. No. 009,117, filed Jan. 29, 1987, which is a continuation of application Ser. No. 717,972 filed Mar. 29, 1985, both now abandoned. j

BACKGROUND OF THE INVENTION

1. Field of the Invention

This invention relates to a method of automatically correcting the density of a subtraction image so that the same appropriate background density is always obtained in a subtraction processing of radiation images, and an apparatus for carrying out the method. This invention particularly relates to a method of automatically correcting the density of a subtraction image so that the same appropriate background density is always obtained in a subtraction processing of radiation images wherein stimulable phosphor sheets are used, and an apparatus for carrying out the method.

2. Description of the Prior Art

Conventionally, a digital subtraction processing method is used for processing radiation images. In the method, two radiation images recorded under conditions different from each other are photoelectrically read out to obtain digital image signals, which are then subjected to a subtraction processing with respect to the corresponding picture elements of the images, thereby to obtain a difference signal for forming an image of a specific structure contained in the radiation images. The method makes it possible to reproduce a radiation image of only the specific structure by use of the signal thus obtained.

Basically, the subtraction processing is classified into the so-called temporal (time difference) subtraction processing method and the so-called energy subtraction processing method. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations having energy distributions different from each other to obtain two radiation images containing image information at least a part of which is different from each other. Then, the image signals of the two radiation images are weighted appropriately, and subjected to subtraction to extract the image of the specific structure in the object.

Since the subtraction processing is extremely effective for diagnostic purposes in image processings for medical X-ray photographs, it has recently attracted much attention, and research has continued to develop improved methods by use of electronic technology. The processing technique is particularly called digital subtraction processing method.

A novel digital subtraction processing method has been proposed, for example, in U.S. patent application Ser. No. 477,542. The method comprises the steps of (i) using two or more stimulable phosphor sheets exhibiting an extremely wide latitude of exposure to a radiation, (ii) exposing the stimulable phosphor sheets to the radiation passing through the same object with and without injection of contrast media to have radiation images of the object stored in the stimulable phosphor sheets, a part of image information being different between the radiation images due to injection of contrast media, (iii) detecting the radiation images by scanning with stimulating rays to obtain digital image signals, and (iv) conducting a digital subtraction processing by use of the digital image signals. The stimulable phosphor sheets comprise a stimulable phosphor which is able to store a part of radiation energy when exposed to radiation such as X-rays, $\alpha$-rays, $\beta$-rays, $\gamma$-rays, cathode rays or ultraviolet rays, and then emit light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when the digital subtraction processing is conducted by use of the radiation images stored in the stimulable phosphor sheets, it is possible to obtain a radiation image having an improved image quality, particularly a high diagnostic efficiency and accuracy.

When a subtraction image is formed on a photographic film or the like by use of the difference signal obtained by the aforesaid temporal subtraction processing, the image density at the portion outside of the specific structure injected with contrast media, i.e. at the background, should be always the same. However, in many cases, the background density is different between subtraction images. This is because the intensity of the radiation to which the stimulable phosphor sheets are actually exposed fluctuates slightly even if the radiation intensity is adjusted to the same value at the radiation image recording, and because the sensitivity of the stimulable phosphor sheets also fluctuates. When the background density is not the same, it is not always possible to correctly diagnose, for example, by comparing many subtraction images.

SUMMARY OF THE INVENTION

The primary object of the present invention is to provide a method cf automatically correcting the density of a temporal subtraction image, which forms subtraction images having always the same background density.

Another object of the present invention is to provide a method of automatically correcting the density of a temporal subtraction image, which forms subtraction images having an improved image quality, particularly a high diagnostic efficiency and accuracy.

The specific object of the present invention is to provide an apparatus for carrying out the method.

The method of automatically correcting the density of a subtraction image in accordance with the present invention comprises the steps of, when a gradation processing is conducted on a difference signal obtained by a temporal subtraction processing wherein stimulable phosphor sheets are used, calculating the maximum transmitting radiation amounts of the digital image signals detected from the stimulable phosphor sheet, calculating the difference $\Delta x$ between the maximum transmitting radiation amounts, and carrying out (i) correction by adding said difference $\Delta x$ to said difference signal prior to the gradation processing, or (ii) correction by shifting a gradation conversion table by said difference $\Delta x$ towards the high density side along the input signal coordinate axis.

The apparatus for carrying out the method of automatically correcting the density of a subtraction image in accordance with the present invention wherein the correction (i) is conducted comprises:

(a) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals, (b) a subtraction operation means for obtaining a difference signal for forming an image of a specific structure by conducting a subtraction processing of the digital image signal of an object injected with contrast media into said specific structure and the digital image signal of the same object without injection of contrast media, said digital image signals being detected by said image read-out means, between the corresponding picture elements of said radiation images, (c) an image processing means for conducting a gradation processing on said difference signal on the basis of a gradation conversion table, (d) an operation means for calculating maximum transmitting radiation amounts of said digital image signals, and (e) a signal correcting circuit for calculating the difference $\Delta x$ between said maximum transmitting radiation amounts and adding said difference $\Delta x$ to said difference signal prior to said gradation processing.

The apparatus for carrying out the method in accordance with the present invention wherein the correction (ii) is conducted comprises, instead of the aforesaid signal correcting circuit, a gradation conversion table correcting circuit for shifting the gradation conversion table by the difference $\Delta x$ towards the high density side along the input signal coordinate axis. The maximum transmitting radiation amounts of the digital image signals detected from the respective stimulable phosphor sheets may be calculated, for example, from histograms of the digital image signals.

FIG. 1 shows examples of the histograms of the digital image signals detected from the stimulable phosphor sheets. The transmitting radiation amounts distribute between the minimum values yA and yB and the maximum values xA and xB corresponding to the maximum background density. The minimum values yA and yB may change with the presence and absence of contrast media, while the maximum values xA and xB corresponding to the maximum background density should be always the same. Therefore, when the maximum values xA and xB are different between images, it is considered that the difference is caused by a difference in radiation intensity at the image recording step and/or a difference in sensitivity of the stimulable phosphor sheets. Accordingly, when correction is conducted as described above to eliminate deviation of the maximum image signal values between images, the density signal at the background portion becomes zero after the subtraction processing of the digital image signals, and the background density of the subtraction images becomes always the same.

The above-mentioned maximum transmitting radiation amounts may be of the digital image signals detected by preliminary read-out for detecting the image information stored in the stimulable phosphor sheets by use of stimulating rays of a level lower than the level of the stimulating rays used in final read-out prior to the final read-out for obtaining the digital image signals used for the temporal subtraction processing, or may be of the digital image signals detected by the final read-out.

The preliminary read-out and the final read-out are disclosed in detail, for example, in Japanese Unexamined Patent Publication No. 58(1983)-89245.

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than, the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In another aspect of the present invention, the read-out conditions for at least one of the stimulable phosphor sheets in the final read-out are adjusted so that the difference $\Delta x$ between the maximum transmitting radiation amounts of the digital image signals obtained by the preliminary read-out is eliminated. In order to eliminate the difference $\Delta x$, the final read-out conditions such as the read-out gain, the intensity of stimulating rays, the image processing conditions and the like may be adjusted.

In a further aspect of the present invention, when the gradation processing is conducted on the difference signal obtained by the subtraction processing, a histogram of the difference signal is obtained, and a maximum image signal density is determined from the histogram. The difference $\Delta x$ between a standard background density signal representing the standard background density of the subtraction image formed by the difference signal and the maximum image signal density is calculated. Thereafter, one of the following corrections is conducted: (i) correction by adding the difference $\Delta x$ to the difference signal prior to the gradation processing, and (ii) correction by shifting a gradation conversion table by the value of $-\Delta x$, which has the same absolute value as that of the difference $\Delta x$ and the sign reverse to the sign thereof, along the input signal coordinate axis.

The apparatus for carrying out the last-mentioned method in accordance with the present invention wherein the correction (i) is conducted comprises:

(a) the image read-out means as described above, (b) the subtraction operation means as described above, (c) the image processing means as described above, (d) a histogram operation means for obtaining a histogram of said difference signal and determining a maximum image signal density from said histogram, (e) a storage means for storing a standard background density of a subtraction image formed by said difference signal, and (f) a signal correcting circuit for calculating the difference $\Delta x$ between a standard background density signal representing said standard background density read from said storage means and said maximum image signal density, and adding said difference $\Delta x$ to said difference signal prior to said gradation processing.

The apparatus for carrying out the last-mentioned method in accordance with the present invention wherein the correction (ii) is conducted comprises, instead of the aforesaid signal correcting circuit, a gradation conversion table correcting circuit for shifting the gradation conversion table by $-\Delta x$, which has the same absolute value as that of the difference $\Delta x$ and the sign reverse to the sign thereof, along the input signal coordinate axis.

The maximum image density density in the histogram of the difference signal is normally the background density of the subtraction image. Therefore, when the correction (i) or (ii) is conducted, the background density in the subtraction images is adjusted to always the same standard background density.

In the present invention, since the background density of the temporal subtraction images obtained by use of two or more stimulable phosphor sheets is adjusted to always the same density, it is possible to obtain subtraction image having an improved image quality, particularly a high diagnostic efficiency and accuracy.

DESCRIPTION OF THE PREFERRED EMBODIMENTS

The present invention will hereinbelow be described in further detail with reference to the accompanying drawings.

Figure 2:
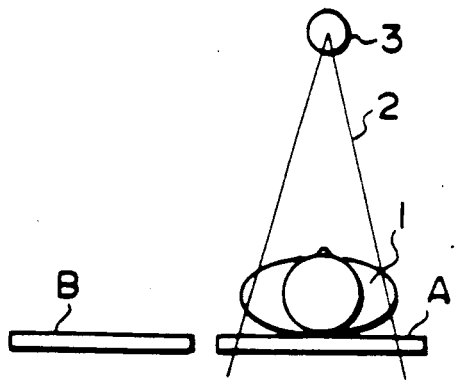
FIG. 2 is an explanatory view showing the radiation image recording step in an embodiment of the method of automatically correcting the density of a subtraction image in accordance with the present invention.

Referring to FIG. 2, two stimulable phosphor sheets A and B are respectively exposed to X-rays 2 passing through an object 1 under conditions different from each other, i.e. with or without injection of contrast media into a specific structure of the object 1. For example, in the case of angiography (digital angiography), an X-ray image of the object 1 before the injection of blood vessel contrast media thereto is recorded on the first stimulable phosphor sheet A as shown in FIG. 2. Then, contrast media are injected into the vein of the same object 1. After a certain period, for example after about 10 seconds in the case of the abdomen, an X-ray image of the object 1 is recorded in the same manner on the second stimulable phosphor sheet B. At both recording stages, the tube voltage of an X-ray source 3 is maintained at the same value, and the relationship between the positions of the object 1 and the stimulable phosphor sheet A is made equal to the relationship between the positions of the object 1 and the stimulable phosphor sheet B. Thus, two X-ray images of the same object 1 are recorded on the stimulable phosphor sheets A and B in exactly the same manner, except for the existence of the contrast media in the specific structure of the object 1.

Figure 3:
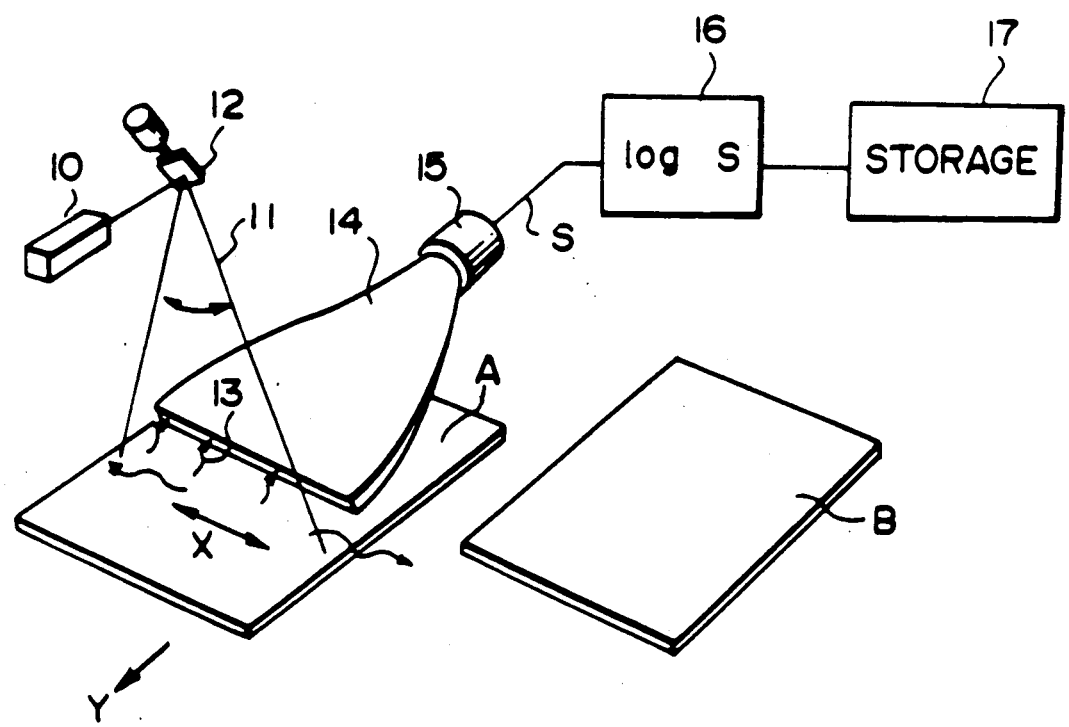
FIG. 3 is a schematic view showing read-out of radiation images stored in stimulable phosphor sheets.

As described above, two radiation images wherein the image information at the portion injected with the contrast media is different from each other are recorded on the stimulable phosphor sheets A and B. From the stimulable phosphor sheets A and B carrying the X-ray images stored therein, the X-ray images are read out by use of the image read-out means as shown in FIG. 3 to obtain digital image signals representing the X-ray images. First, while the stimulable phosphor sheet A is moved in the direction as indicated by the arrow Y to conduct sub-scanning, a laser beam 11 emitted by a laser beam source 10 is deflected in the direction as indicated by the arrow X by a scanning mirror 12 to conduct main scanning. In this manner, the stimulable phosphor sheet A is caused to release the X-ray energy stored therein as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is outputted as an image signal S by the photomultiplier 15. The image signal S is then converted into a digital image signal logSA of a logarithmic value (logS) by a log-converter 16 comprising an amplifier and an A/D converter. The digital image signal logSA is stored in a storage medium 17 such as a magnetic tape. Thereafter, the X-ray image stored in the other stimulable phosphor sheet B is read out therefrom in exactly the same manner as described above, and a digital image signal logSB thus obtained is stored in the storage medium 17.

Figure 4:
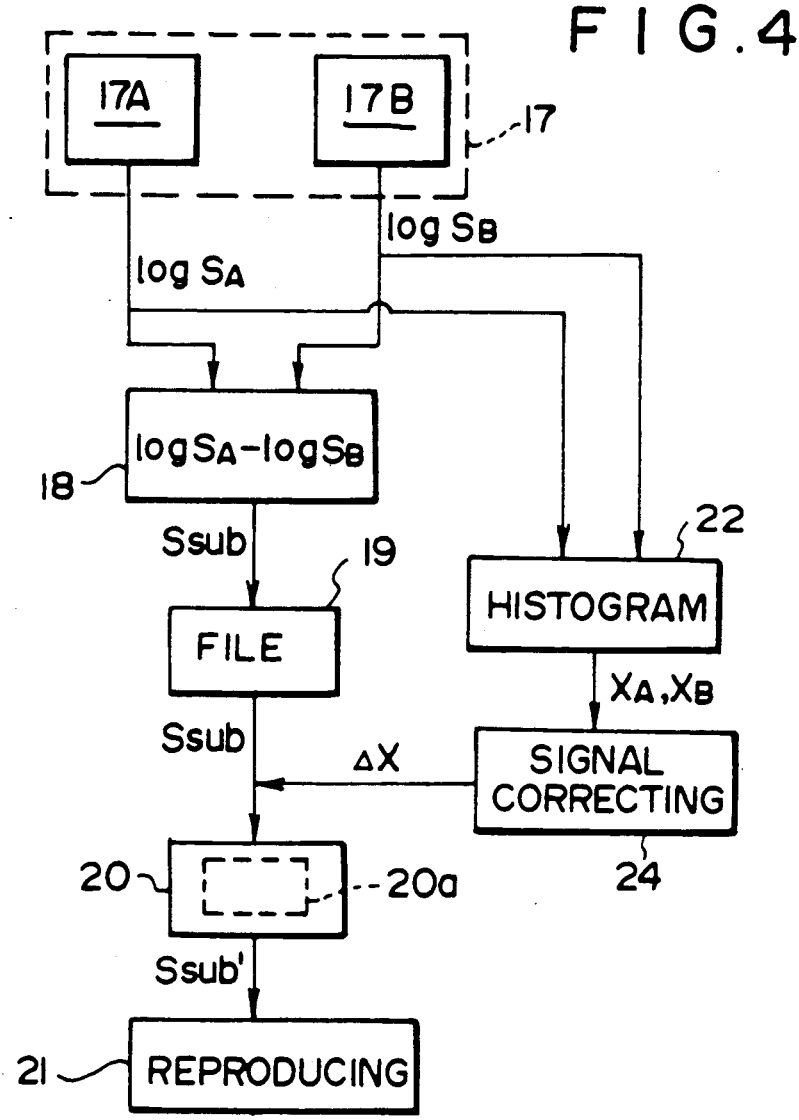
FIG. 4 is a block diagram showing the subtraction processing wherein an embodiment of the method of automatically correcting the density of a subtraction image in accordance with the present invention is employed.

Thereafter, a subtraction processing is conducted by use of the digital image signals logSA and logSB obtained as described above. FIG. 4 shows the flow of the subtraction processing conducted by automatically carrying out density correction in accordance with an embodiment of the method of the present invention. The digital image signals logSA and logSB are respectively read from image files 17A and 17B in the storage medium 17, and are sent to a subtraction operation circuit 18 which carries out subtraction between the digital image signals logSA and logSB with respect to the corresponding picture elements to obtain a digital difference signal Ssub. After the difference signal Ssub is once stored in an image file 19, it is sent to an image processing circuit 20 which conducts gradation processing on the basis of a gradation conversion table 20a.

Figure 5:
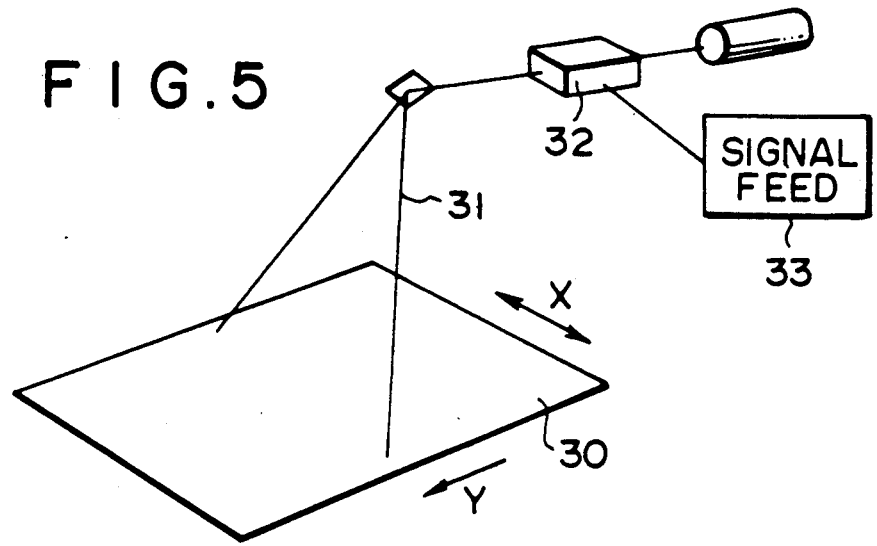
FIG. 5 is a schematic view showing an example of the system for reproducing the subtraction image.

A difference signal Ssub' obtained by the gradation processing is sent to an image reproducing apparatus 21, for example, a display device such as a cathode ray tube (CRT) or a point-by-point scanning apparatus, and is used for reproducing a visible subtraction image. FIG. 5 shows an apparatus for reproducing the image by point-by-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction as indicated by the arrow X. The laser beam 31 is modulated by an A/0 modulator 32 with an image signal sent from an image signal feeder 33, thereby to form a visible image on the photosensitive film 30. By using the difference signal Ssub' as the image signal sent from the image signal feeder 33, it is possible to reproduce a visible image of a desired specific structure obtained by the digital subtraction processing on the photosensitive film 30.

Figure 6:
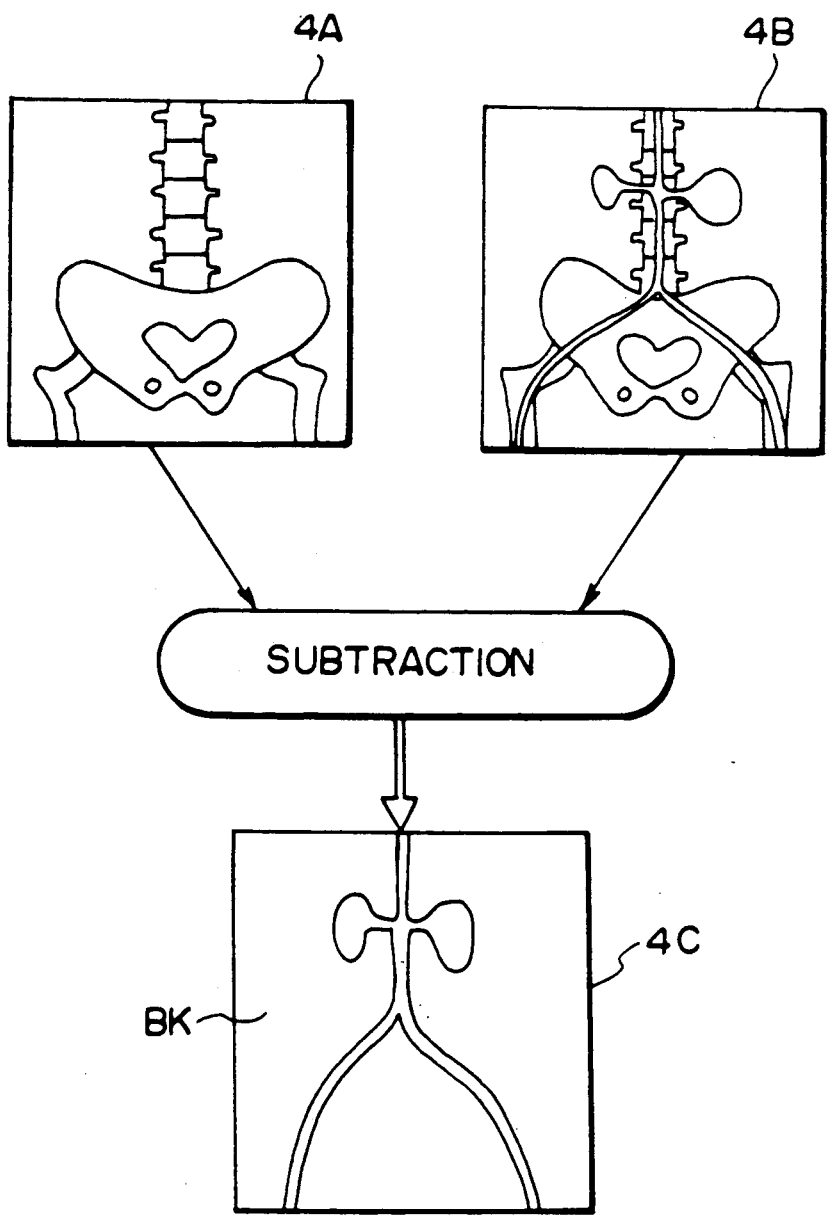
FIG. 6 is a schematic view showing examples of the radiation image of an object injected with contrast media, the radiation image of the object without injection of contrast media, and the temporal subtraction image obtained from the radiation images.

FIG. 6 shows the manner in which the image of the desired specific structure is obtained by the aforesaid subtraction processing. In FIG. 6, a reference character 4A designates an image obtained from the first stimulable phosphor sheet A in which an X-ray image of the abdomen before the injection of contrast media thereto is stored. A reference character 4B designates an image obtained from the second stimulable phosphor sheet B in which an X-ray image of the same abdomen after the injection of contrast media thereto is stored. A reference character 4C denotes a subtraction image obtained after conducting the subtraction processing by subtracting a digital image signal representing the image 4A from a digital image signal representing the image 4B, so that only the blood vessel can be observed.

Figure 1:
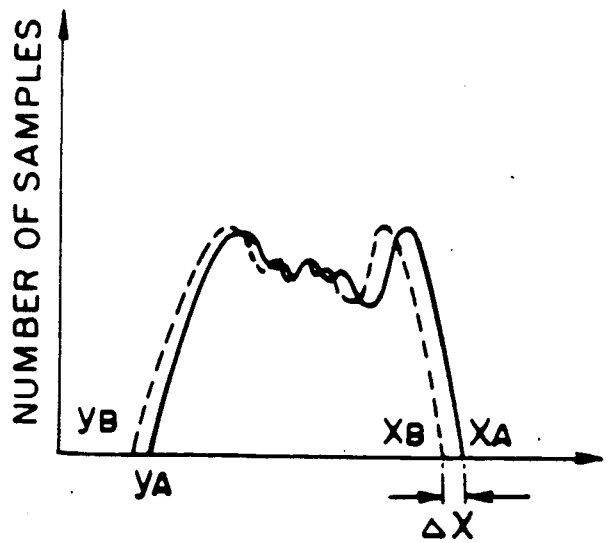
FIG. 1 is a graph showing examples of histograms of digital image signals used for temporal subtraction processing.

The difference signal Ssub at the background BK around the extracted specific structure (blood vessel) in the subtraction image 4C should naturally becomes zero, and the density of the background BK should be always the same in the reproduced images. However, the density of the background BK is not always the same due to a fluctuation in radiation intensity at the image recording step and/or a fluctuation in sensitivity of the stimulable phosphor sheets A and B. Therefore, as shown in FIG. 4, the digital image signals logSA and logSB are sent to a histogram operation circuit 22 for obtaining histograms of the digital image signals logSA and logSB. As shown in FIG. 1, the histograms distribute between the maximum transmitting radiation amounts xA, xB corresponding to the maximum density of the background BK and the minimum transmitting radiation amounts yA, yB. As described above, the maximum values xA and xB in the two images should be equal to each other. However, actually, the background density is different between the stimulable phosphor sheets A and B and the maximum values xA and xB do not coincide with each other due to a difference in radiation intensity between the image recording stages and/or a difference in sensitivity between the stimulable phosphor sheets A and B. Accordingly, in order to eliminate the problem, signals representing the maximum values xA and xB are sent to a signal correcting circuit 24 which calculates the difference $\Delta x$ between the maximum values xA and xB, and the difference $\Delta x$ is added to the difference signal Ssub. By the addition of the difference $\Delta x$ to the difference signal Ssub, the signal component (xA-xB, i.e. $\Delta x$) contained in the difference signal Ssub due to a difference in radiation intensity between image recording stages and/or a difference in sensitivity between the stimulable phosphor sheets A and B is eliminated, and the signal at the background becomes always zero. Therefore, the density of the background BK in the reproduced subtraction image becomes always the same.

Figure 7:
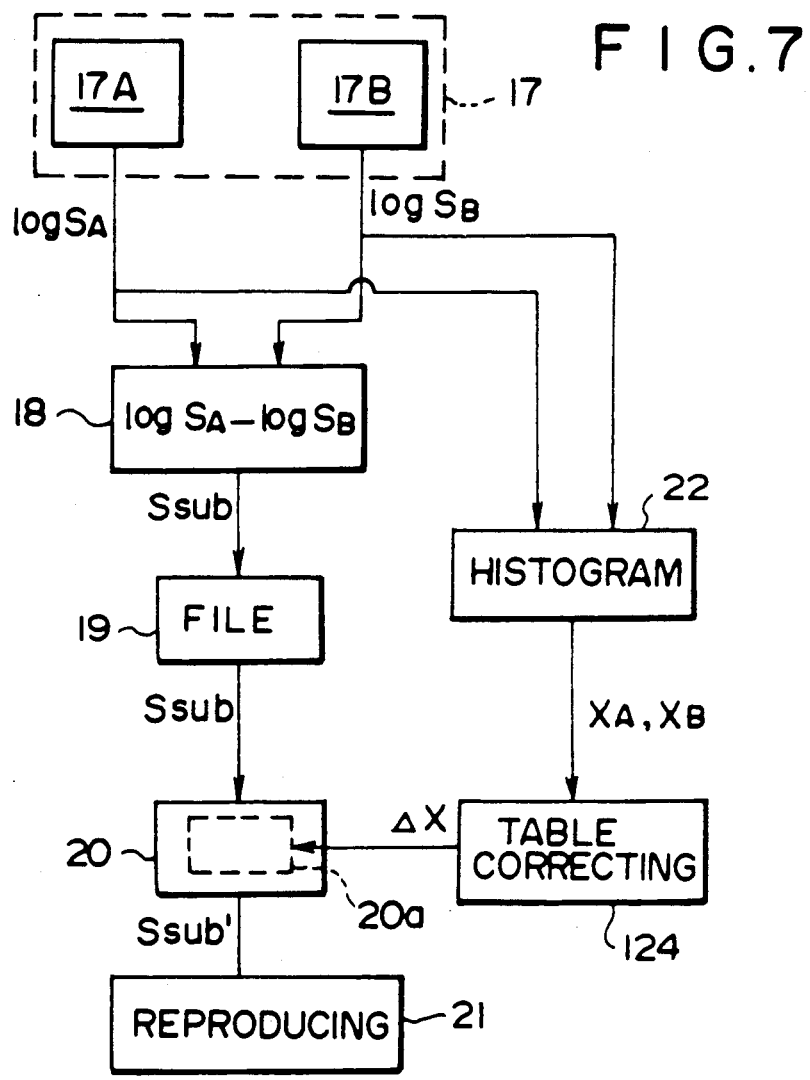
FIG. 7 is a block diagram showing the subtraction processing wherein another embodiment of the method of automatically correcting the density of a subtraction image in accordance with the present invention is employed.
Figure 8:
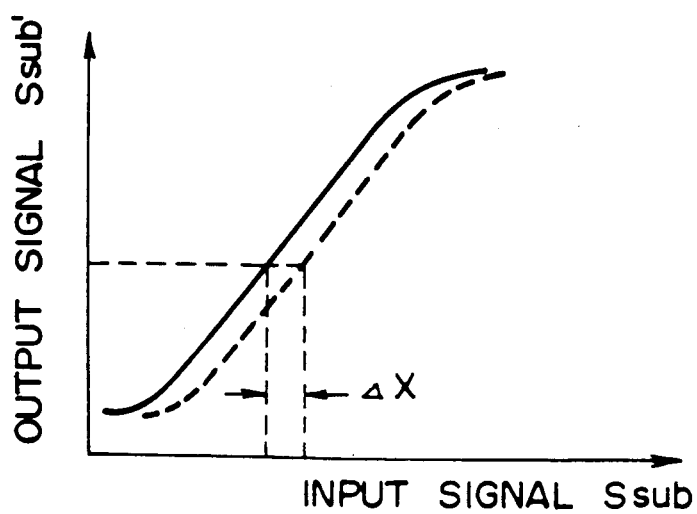
FIG. 8 is a graph showing the correction of a gradation conversion table in the embodiment of FIG. 7.

FIG. 7 shows the flow of the subtraction processing conducted by automatically carrying out density correction in accordance with another embodiment of the method of the present invention. In this case, the signals representing the maximum values xA and xB are sent from the histogram operation circuit 22 to a gradation conversion table correcting circuit 124. The gradation conversion table 20a used in the image processing circuit 20 is as shown in FIG. 8. The gradation conversion table correcting circuit 124 calculates the difference $\Delta x$ between the maximum values xA and xB, and shifts the predetermined gradation conversion table 20a of the image processing circuit 20 as indicated by the full line in FIG. 8 by the difference $\Delta x$ towards the high density side along the input signal coordinate axis as indicated by the broken line in FIG. 8. When the gradation conversion table 20a is shifted in this manner, the difference signal Ssub' obtained by the gradation processing becomes always the same as when the difference signal Ssub which does not contain the signal component $\Delta x$ caused by a fluctuation in radiation intensity at the image recording step and/or a fluctuation in sensitivity of the stimulable phosphor sheets A and B is gradation processed by use of the predetermined gradation conversion table 20a. Therefore, in the subtraction image obtained by use of the difference signal Ssub', the density of the background BK becomes always the same.

The method of calculating the maximum transmitting radiation amounts of the digital image signals is not limited to the one using the histograms. For example, it is also possible to sequentially compare the image signals to select the largest values. Therefore, in the above-mentioned embodiments, the histogram operation circuit 22 may be replaced by a different operation means for calculating the maximum values.

The above-mentioned maximum transmitting radiation amounts may also be calculated from the digital image signals detected by preliminary read-out conducted prior to final read-out for obtaining the digital image signals used for the temporal subtraction processing. Such embodiments will be described below with reference to FIGS. 9, 10 and 11.

Figure 9:
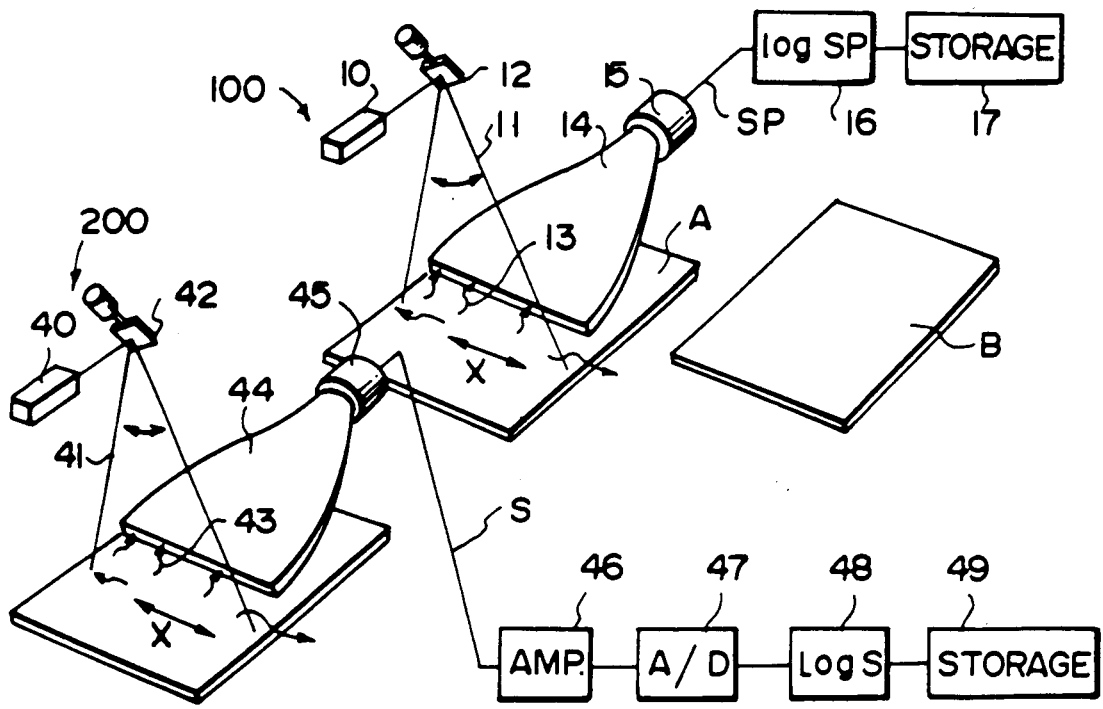
FIG. 9 is a schematic view showing radiation image read-out in a further embodiment of the method in accordance with the present invention.

FIG. 9 shows an image read-out means for conducting the preliminary read-out and the final read-out. In FIG. 9, similar elements are numbered with the same reference numerals with respect to FIG. 3. In a preliminary read-out section 100, the X-ray image stored in the stimulable phosphor sheet A in the same manner as shown in FIG. 2 is scanned by the laser beam 11 as described with reference to FIG. 3, and the light 13 emitted by the stimulable phosphor sheet A is converted by the photomultiplier 15 into a preliminary read-out image signal SP. The preliminary read-out image signal SP is converted by the log-converter 16 into a preliminary read-out digital image signal logSPA which is then stored in the storage medium 17. Thereafter, the X-ray image stored in the stimulable phosphor sheet B is read out in the same manner, and a preliminary read-out digital image signal logSPB thus obtained is stored in the storage medium 17.

Thereafter, the stimulable phosphor sheet A is sent to a final read-out section 200 comprising a laser beam source 40, a scanning mirror 42, a light guide member 44 and a photomultiplier 45 as in the preliminary read-out section 100. In the final read-out section 200, light 43 emitted by the stimulable phosphor sheet A when it is exposed to a laser beam 41 is guided to the photomultiplier 45, and the image stored in the stimulable phosphor sheet A is photoelectrically detected (final read-out). The output of the laser beam source 10 for the preliminary read-out is adjusted to a value lower than the output of the laser beam source 40 for the final read-out, preferably to 10% or less of the latter, more preferably to 3% or less of the latter, so that the radiation energy stored in the stimulable phosphor sheet A is not so much dissipated before the final read-out.

A final read-out image signal S generated by the final read-out photomultiplier 45 is amplified by an amplifier 46 and converted by an A/D converter 47 into a digital signal. The digital signal is then sent to a log-converter 48 which converts it into digital image signal logSA of a logarithmic value (logS). The digital image signal logSA is stored in a storage medium 49 such as a magnetic tape. Then, the image stored in the other stimulable phosphor sheet B is read out therefrom in exactly the same manner as described above, and a digital image signal logSB thus obtained is stored in the storage medium 49.

Figure 10:
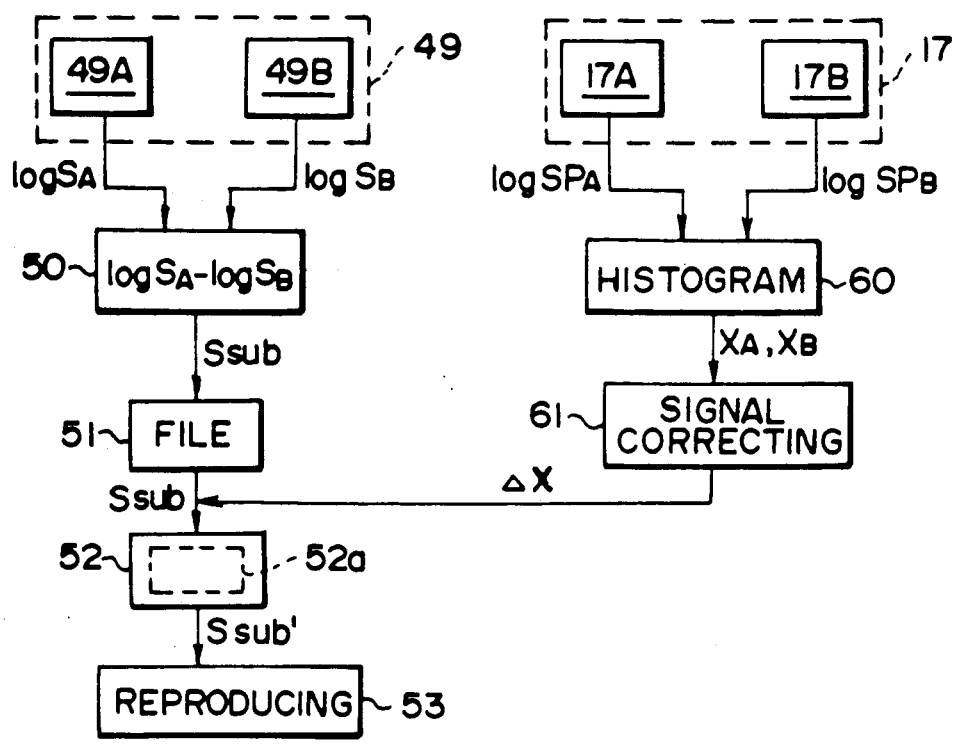
FIG. 10 is a block diagram showing the subtraction processing wherein the further embodiment of the method in accordance with the present invention is employed.

Thereafter, a subtraction processing is conducted by use of the final read-out digital image signals logSA and logSB obtained as described above. FIG. 10 shows the flow of the subtraction processing conducted by automatically carrying out density correction in accordance with an embodiment of the method of the present invention. The digital image signals logSA and logSB are respectively read from image files 49A and 49B in the storage medium 49, and are sent to a subtraction operation circuit 50 which carries out subtraction between the digital image signals logSA and logSB with respect to the corresponding picture elements to obtain a digital difference signal Ssub. After the difference signal Ssub is once stored in an image file 51, it is sent to an image processing circuit 52 which conducts a gradation processing on the basis of a gradation conversion table 52a.

A difference signal Ssub' obtained by the gradation processing is sent to an image reproducing apparatus 53 which may, for example, be of the same type as the apparatus shown in FIG. 5, and is used for reproducing a visible subtraction image as shown in FIG. 6.

Figure 11:
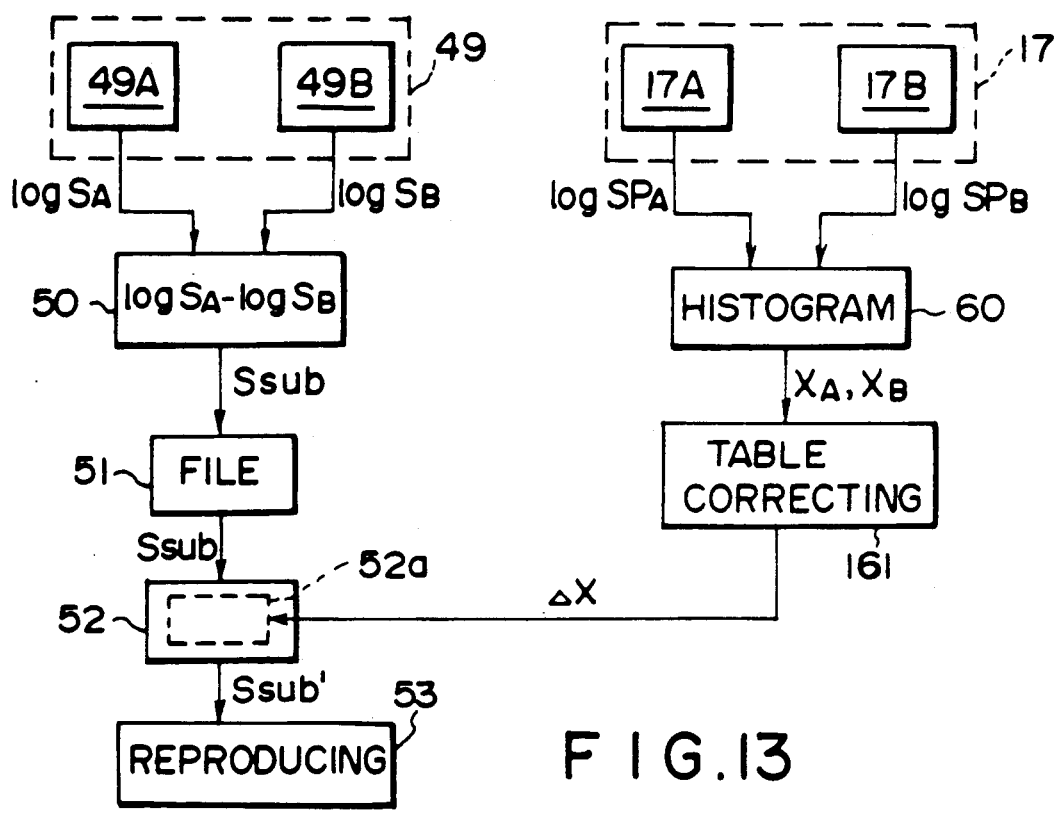
FIGS. 11, 12 and 13 are block diagrams showing the subtraction processing wherein still further embodiments of the method in accordance with the present invention are employed.

In the embodiment of FIG. 10, in order to make the background density in the reproduced subtraction images always the same, the preliminary read-out digital image signals logSPA and logSPB stored in the image files 17a and 17b of the storage medium 17 are sent to a histogram operation circuit 60 for obtaining histograms of the digital image signals logSPA and logSPB as shown in FIG. 1. Then, the signals representing the maximum values xA and xB calculated by the histogram operation circuit 60 are sent to a signal correcting circuit 61 which calculates the difference $\Delta x$ between the maximum values xA and xB, and the difference $\Delta x$ is added to the difference signal Ssub. FIG. 11 shows the flow of the subtraction processing conducted by automatically carrying out density correction in accordance with a further embodiment of the method of the present invention. In this case, the signals representing the maximum values xA and xB and obtained in the manner as described with reference to FIG. 10 are sent from the histogram operation circuit 60 to a gradation conversion table correcting circuit 161. The gradation conversion table 52a used in the image processing circuit 52 is as shown in FIG. 8. The gradation conversion table correcting circuit 161 calculates the difference $\Delta x$ between the maximum values xA and xB in the same manner as the signal correcting circuit 61 in FIG. 10, and shifts the predetermined gradation conversion table 52a of the image processing circuit 52 as indicated by the full line in FIG. 8 by the difference $\Delta x$ towards the high density side along the input signal coordinate axis as indicated by the broken line in FIG 8.

Figure 12:
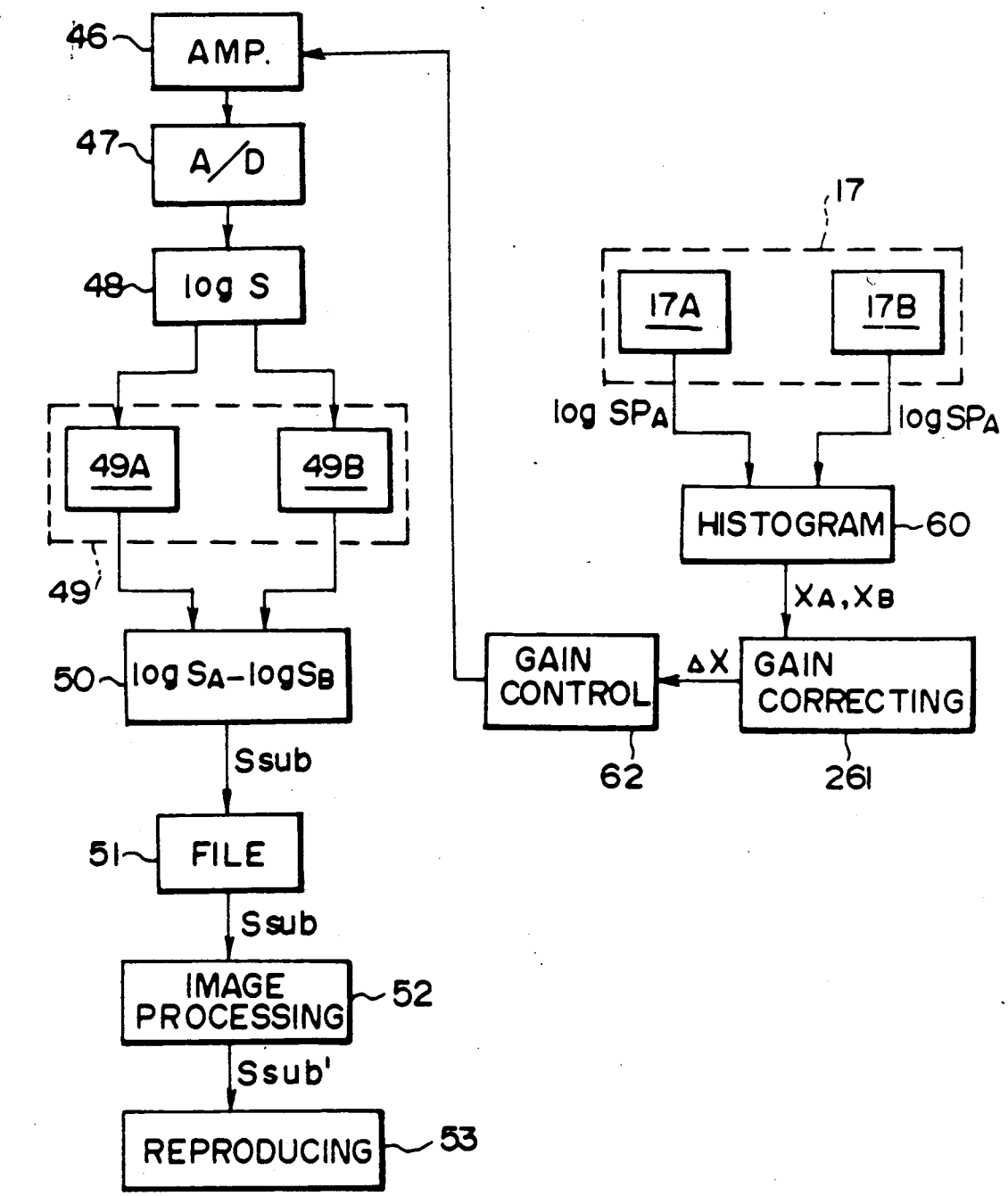

FIG. 12 shows the flow of the subtraction processing conducted by automatically carrying out density correction in accordance with a still further embodiment of the method of the present invention, wherein the maximum transmitting radiation amount are calculated from the digital image signals detected by the preliminary read-out conducted in the same manner as shown in FIG. 9, and the read-out conditions for at least one of the stimulable phosphor sheets in the final read-out are adjusted so that the difference $\Delta x$ between the maximum transmitting radiation amounts is eliminated. In FIG. 12, similar elements are numbered with the same reference numerals with respect to FIGS. 9, 10 and 11. The histograms of the preliminary read-out digital image signals logSPA and logSPB as shown in FIG. 1 are obtained by the histogram operation circuit 60 in the same manner as described above, and the signals representing the maximum transmitting radiation amounts xA and xB calculated from the histograms are sent to a gain correcting circuit 261. The gain correcting circuit 261 calculates the difference $\Delta x$ between the maximum values xA and xB, and calculates read-out gains for the stimulable phosphor sheets A and B so that the difference $\Delta x$ is eliminated. When the final read-out is conducted as shown in FIG. 9, the information on the read-out gains for the stimulable phosphor sheets A and B thus calculated is sent to a gain control circuit 62 which changes the read-out gain of the amplifier 46 at the final read-out step in accordance with the read-out gain information.

In the final read-out digital image signals logSA and logSB obtained by adjusting the read-out gains as described above, the values of the maximum transmitting radiation amount signals xA and xB corresponding to the maximum background sensity become equal to each other. Therefore, when the subtraction processing is conducted as described above, the digital image signal at the background becomes always zero in the obtained difference signal Ssub, and the background density in the subtraction image formed on the basis of the difference signal Ssub becomes always the same.

In the embodiment of FIG. 12, the read-out gains as one of the read-out conditions in the final read-out is changed between the stimulable phosphor sheets so that the background density in the subtraction images becomes always the same. However, it is also possible to change the read-out conditions other than the read-out gain, for example, to change the intensity of stimulating rays in accordance with the difference $\Delta x$ between the maximum transmitting radiation amounts. The read-out conditions may be changed for only one of the stimulable phosphor sheets or for both thereof in accordance with the difference $\Delta x$.

In the embodiments of FIGS. 10, 11 and 12, the level of the stimulating rays in the preliminary read-out is made lower than the level of the stimulating rays in the final read-out by making the output of the laser beam source for the preliminary read-out lower than the output of the laser beam source for the final read-out. However, the method of making the level of the stimulating rays in the preliminary read-out lower than that in the final read-out is not limited to this method, and any other methods as described above may be employed. Further, the preliminary read-out and the final read-out may be carried out by use of the same image read-out means by changing the level of the stimulating rays. Also, the histogram operation circuit 60 may be replaced by any other operation means for calculating the maximum transmitting radiation amounts.

Figure 13:
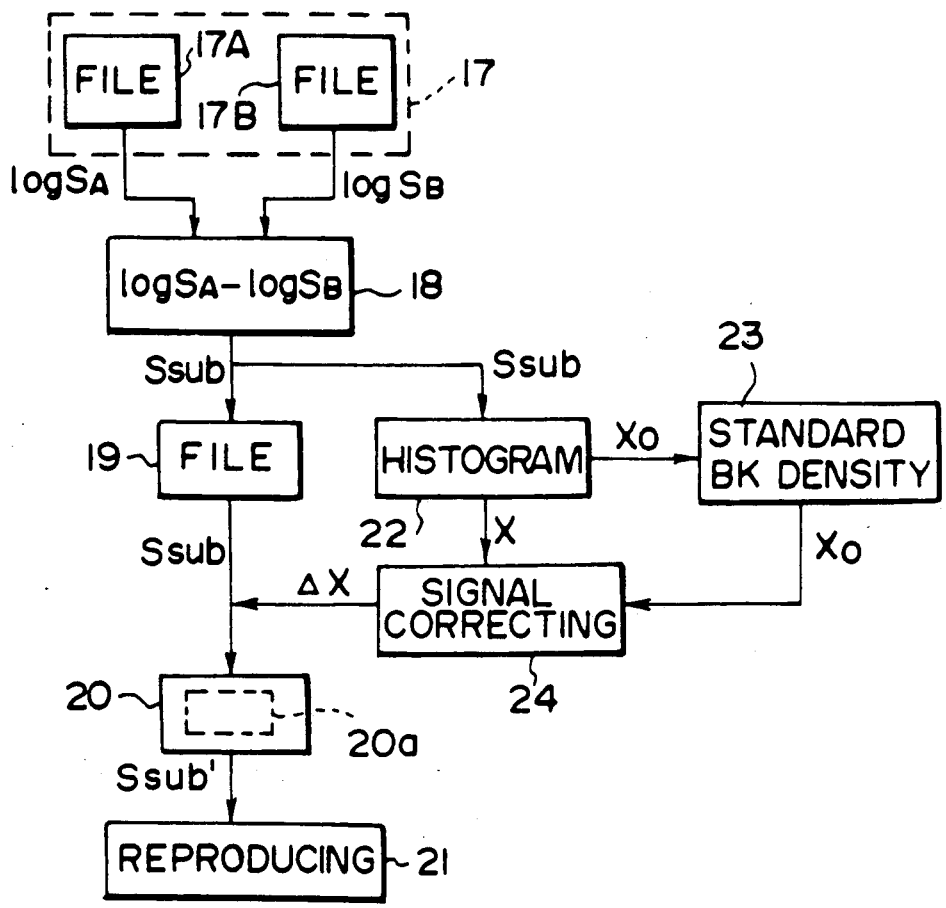
Figure 14:
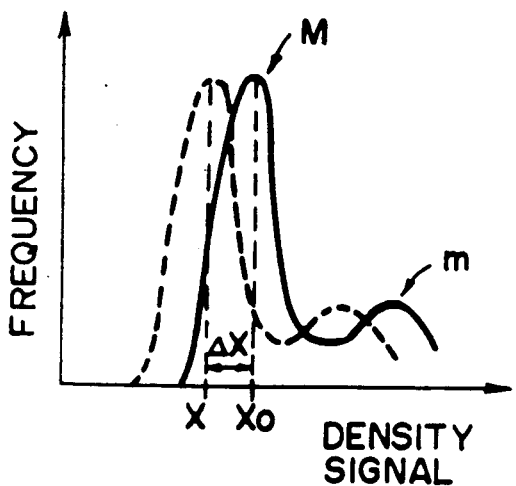
FIG. 14 is a graph showing examples of histograms of the difference signals for forming subtraction image in the embodiment of FIG. 13.

FIG. 13 shows the flow of the subtraction processing conducted by automatically carrying out density correction in accordance with a still further embodiment of the method of the present invention. In FIG. 13, similar elements are numbered with the same reference numerals with respect to FIG. 4. In this embodiment, the difference signal Ssub calculated by the subtraction operation circuit 18 as described above with reference to FIG. 4 is sent to the histogram operation circuit 22, and a histogram of the difference signal Ssub is obtained. As shown in FIG. 14, the histogram normally has a high peak portion M corresponding to the background region BK, and a low peak portion m corresponding to the specific structure injected with contrast media. Therefore, when the position of the high peak portion M is always the same, the density at the background BK becomes always the same. However, the histogram fluctuates as indicated by the broken line in FIG. 14 for the reasons as described above Therefore, when the histogram indicated by the full line in FIG. 14 is obtained by such a difference signal that the density of the background BK in the reproduced image becomes equal to the desired standard density, i.e. the standard background density, a maximum frequency point signal x in the actually obtained histogram is subtracted from a maximum frequency point signal x0, i.e. the standard background density signal, in the histogram indicated by the full line, thereby calculating the difference $\Delta x(=x0-x)$. As shown in FIG. 13, the calculation is conducted by the signal correcting circuit 24 by sending the maximum frequency point signal x of the actual histogram calculated by the histogram operation circuit 22 and the standard background density signal x0 read from a storage means 23 storing the standard background density to the signal correcting circuit 24. The signal correcting circuit 24 adds the difference $\Delta x$ to the difference signal Ssub read from the image file 19. Therefore, the difference signal Ssub is always corrected so that the maximum frequency point signal of the histogram of the difference signal Ssub becomes equal to x0, and the background density in the subtraction image obtained by the basis of the corrected difference signal Ssub becomes always equal to the standard background density.

Figure 16:
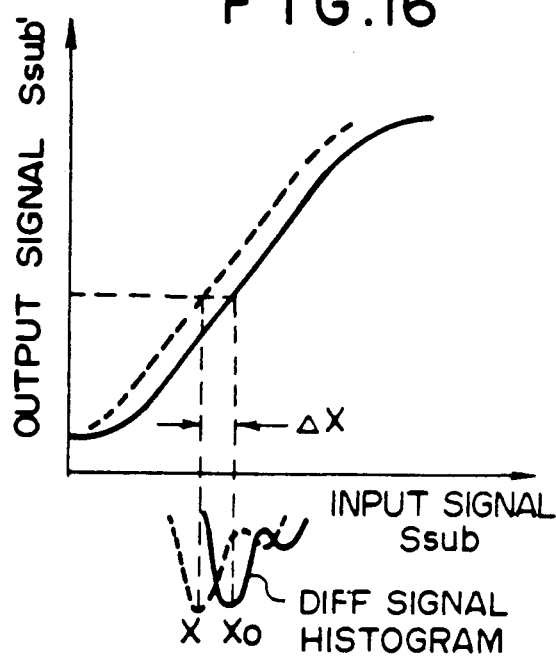
FIG. 16 is a graph showing the correction of a gradation conversion table in the embodiment of FIG. 15.
Figure 15:
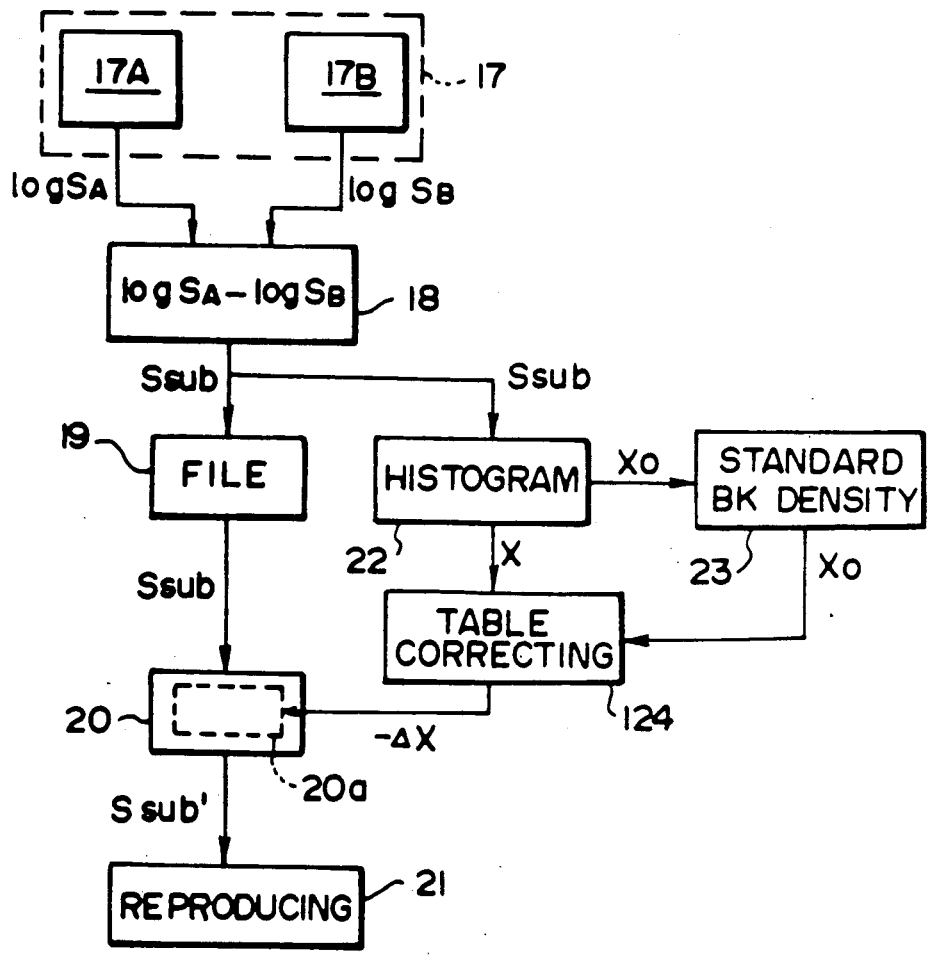
FIG. 15 is a block diagram showing the subtraction processing wherein an even further embodiment of the method in accordance with the present invention is employed.

FIG. 15 shows the flow of the subtraction processing conducted by automatically carrying out density correction in accordance with another embodiment of the method of the present invention. In this embodiment, the maximum frequency point signal x obtained by the histogram operation circuit 22 of FIG. 13 and the standard background density signal x0 obtained by the storage means 23 of FIG. 13 are sent to a gradation conversion table correcting circuit 124. The gradation conversion table 20a used in the image processing circuit 20 is as shown in FIG. 16. The gradation conversion table correcting circuit 124 calculates $\Delta x = x0 - x$ in the same manner as the signal correcting circuit 24 of FIG. 13, and sends the correction term $-\Delta x$ to the image processing circuit 20 for shifting the predetermined gradation conversion table 20a as indicated by the full line in FIG. 16 by $-\Delta x$ along the input signal coordinate axis as indicated by the broken line in FIG 16. When the gradation conversion table 20a is thus shifted, the value of the difference signal Ssub' obtained after the gradation processing becomes always the same as when the difference signal Ssub wherein the maximum frequency point signal of the histogram is equal to the standard background density signal x0 is gradation processed by use of the predetermined gradation conversion table 20a. Therefore, in the subtraction image formed by the difference signal Ssub', the density of the background BK becomes always equal to the standard background density.

In the embodiments of FIGS. 13 and 15, the standard background density signal x0 is fixed by calculating the maximum frequency point signal of the histogram of the difference signal Ssub which forms a subtraction image having the desired standard background density. However, instead of obtaining the histogram of the difference signal Ssub, it is also possible to extract the background density signal from the difference signal Ssub, which forms the subtraction image having the standard background density, by specifying the image coordinate point, or to generate a signal representing the desired standard background density from the difference signal Ssub.

I claim:

1. In temporal subtraction processing for radiation images including the steps of exposing two or more stimulable phosphor sheets respectively to radiation passing through an object injected with contrast media into a specific structure and radiation passing through said object without injection of contrast media to thereby store radiation images of said object in said stimulable phosphor sheets, the image information from said specific structure being different between radiation images, scanning said stimulable phosphor sheets by stimulating rays which cause said stimulable phosphor sheets to emit light in proportion to the stored radiation energy, photoelectrically detecting and converting the amounts of emitted light into digital image signals, obtaining a difference signal for forming an image of said specific structure by carrying out subtraction processing of said digital signals between corresponding picture elements of said radiation difference signal on the basis of a predetermined gradation conversion table,
a method of automatically correcting the density of a subtraction image, which comprises the steps of:
obtaining a histogram of said difference signal, calculating a signal corresponding to a maximum frequency point of said histogram from said histogram, calculating the difference $\Delta x$ between a standard background density of a subtraction image formed by said difference signal and said signal corresponding to a maximum frequency point of said histogram, and carrying out correction by adding said difference $\Delta x$ to said difference signal prior to said image gradation processing.

2. An apparatus for automatically correcting the density of a subtraction image, which comprises:
(a) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals,
(b) a subtraction operation means for obtaining a difference signal for forming an image of said specific structure by carrying out subtraction processing between corresponding picture elements of the digital image signal of an object injected with contrast media into said specific structure and the digital image signal of the same object without injection of contrast media, said digital image signal being detected by said image read-out means,
(c) an image processing means for conducting gradation processing on said difference signal on the basis of a gradation conversion table,
(d) a histogram operation means for obtaining a histogram of said difference signal and determining a signal corresponding to the maximum frequency point of said histogram from said histogram,
(e) storage means for storing a standard background density of a subtraction image formed by said difference signal, and
(f) a signal correction circuit for calculating the difference $\Delta x$ between a standard background density signal representing said standard background density read from said storage means and said maximum image density, and adding said difference $\Delta x$ to said difference signal prior to said gradation processing.

3. An apparatus for automatically correcting the density of a subtraction image, which comprises:
(a) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals,
(b) a subtraction operation means for obtaining a difference signal for forming an image of said specific structure by carrying out subtraction processing between corresponding picture elements of the digital image signal of an object injected with contrast media into said specific structure and the digital image signal of the same object without injection of contrast media, said digital image signal being detected by said image read-out means,
(c) an image processing means for conducting gradation processing on said difference signal on the basis of a gradation conversion table,
(d) a histogram operation means for obtaining a histogram of said difference signal and determining a signal corresponding to the maximum frequency point of said histogram from said histogram,
(e) storage means for storing a standard background density of a subtraction image formed by said difference signal, and
(f) a gradation conversion table correcting circuit for calculating the difference $\Delta x$ between a standard background density signal representing said standard background density read from said storage means and said maximum image density, and shifting said gradation conversion table by $-\Delta x$, which has the same absolute value as that of said difference signal $\Delta x$ and the sign reverse thereof, along the input signal coordinate axis.

4. In temporal subtraction processing for radiation images including the steps of exposing two or more stimulable phosphor sheets respectively to radiation passing through an object injected with contrast media into a specific structure and radiation passing through said object without injection of contrast media to thereby store radiation image of said object in said stimulable phosphor sheets, the image information from said specific structure being different between radiation images, scanning said stimulable phosphor sheets by stimulating rays which cause said stimulable phosphor sheets to emit light in proportion to the stored radiation energy, photoelectrically detecting and converting the amounts of emitted light into digital image signals, obtaining a difference signal for forming an image of said specific structure by carrying out subtraction processing of said digital signal between corresponding picture elements of said radiation images, and conducting gradation processing of said difference signal on the basis of a predetermined gradation conversion table,
a method of automatically correcting the density of a subtraction image, which comprises the steps of:
obtaining a histogram of said difference signal, calculating a signal corresponding to a maximum frequency point of said histogram from said histogram, calculating the difference $\Delta x$ between a standard background density signal representing the standard background density of a subtraction image formed by said difference signal and said signal corresponding to a maximum frequency point of said histogram, and carrying out correction by shifting said gradation table used for said gradation processing by the value of $-\Delta x$, which has the same absolute value as that of said difference signal $\Delta x$ and the sign reverse thereof, along the input signal coordinate axis.

* * * * *